May 27, 1969 K. R. WILKINSON 3,446,557
MEASUREMENT OF CIRCULAR DICHROISM
Filed April 20, 1966
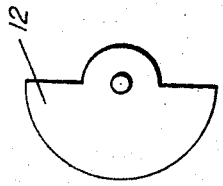
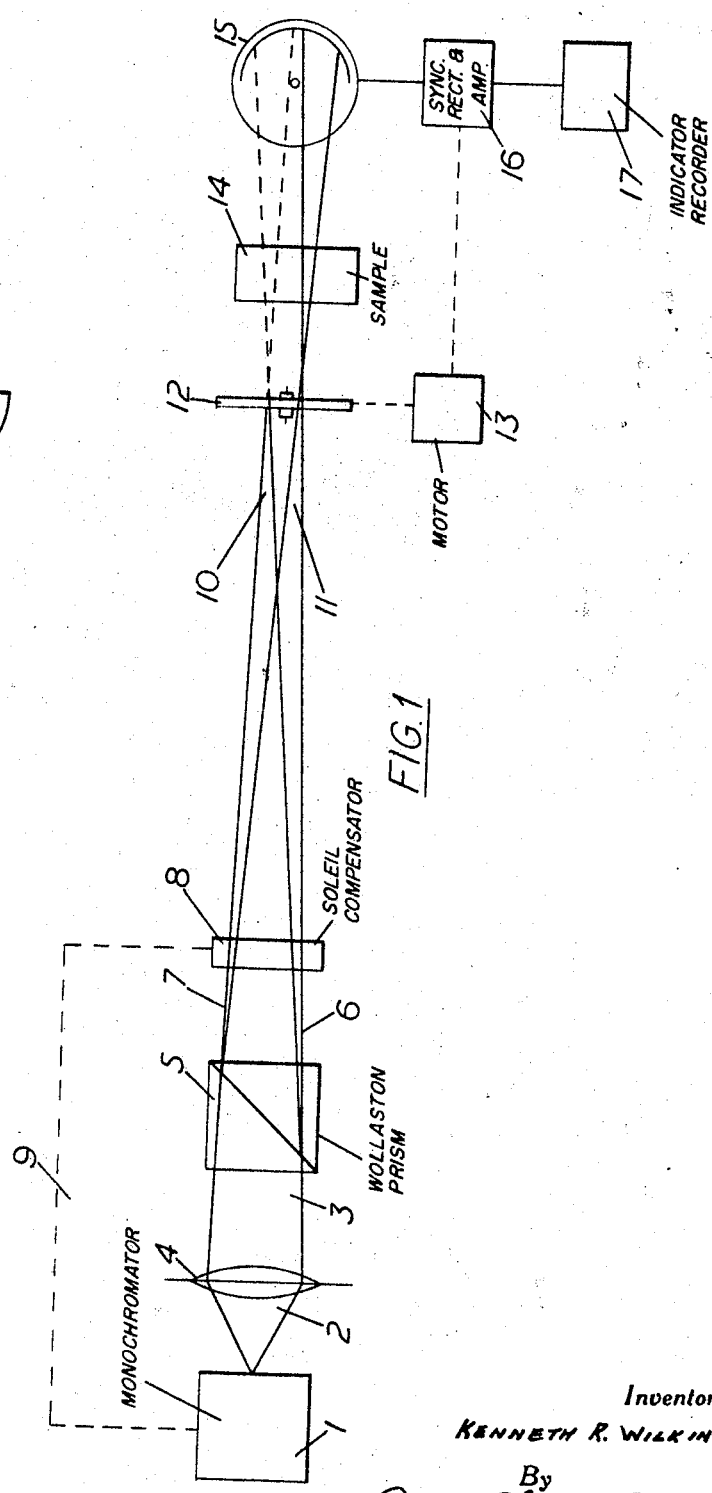
FIG.3
FIG.1
Inventor:
KENNETH R. WILKINSON
By
Browne, Schuyler & Beveridge
Attorneys

# United States Patent Office 3,446,557
Patented May 27, 1969

3,446,557
MEASUREMENT OF CIRCULAR DICHROISM
Kenneth R. Wilkinson, Cambridge, England, assignor to
Pye Limited, Cambridge, England
Filed Apr. 20, 1966, Ser. No. 544,019
Claims priority, application Great Britain, Apr. 21, 1965,
16,894/65
Int. Cl. G01j 3/42
U.S. Cl. 356—95                                      9 Claims

ABSTRACT OF THE DISCLOSURE

To measure the circular dichroism of a sample, a non-polarised light beam is polarised into two orthogonally plane polarised beams which are converted respectively into beams circularly polarised in opposite rotational senses; these circularly polarised beams are passed alternately through a sample of the material and the intensities of the two emergent beams are compared.

---

The present invention relates to the measurement of circular dichroism.

The term "dichroism" is often used to denote the property possessed by some materials of absorbing light to different extents dependent upon the polarisation form of the incident beam. Where the absorption of light circularly polarised in one direction (right-handed) is different from the absorption of the light circularly polarised in the opposite direction (left-handed), the material is said to exhibit circular dichroism.

An object of the present invention is the provision of a method and means for the direct measurement of the degree of circular dichroism exhibited by a material.

A feature of the invention is a method of measuring the degree of circular dichroism exhibited by a material by deriving from a common non-polarised beam of radiation two orthogonally plane polarised beams, converting the two beams respectively into beams circularly polarised in opposite rotational senses, passing the circularly polarised beams through a sample of the material and comparing the intensities of the beams emergent from the sample.

Another feature of the invention is apparatus for measuring the degree of circular dichroism exhibited by a material comprising means for deriving from a non-polarised beam of radiation two orthogonally plane polarised beams, means for converting the two plane polarised beams respectively into beams circularly polarised in opposite rotational senses, means for passing the circularly polarised beams through a sample of the material and a detector for comparing the intensities of the beams emergent from the sample.

The two circularly polarised beams may most conveniently be arranged to be of equal intensity upon incidence with the sample and may be produced by means common to both beams. The circularly polarising means may be either of the chromatic type requiring adjustment for each different radiation frequency, or of the achromatic type, producing circularly polarised radiation without adjustment over a range of radiation frequencies. The apparatus may also comprise an adjustable monochromator for producing radiation of different frequency for passage through the apparatus. Where chromatic circularly polarising means are employed the adjustable monochromator may be linked thereto to provide automatic adjustment of the circularly polarising means for each different radiation frequency.

A preferred embodiment of the present invention will now be described in greater detail by way of example with reference to the accompanying drawings of which:

FIGURE 1 is the block diagram of an instrument in accordance with the invention;

FIGURE 3 is a side elevation of a chopper blade used in the instrument of FIGURE 1.

Figure 2:
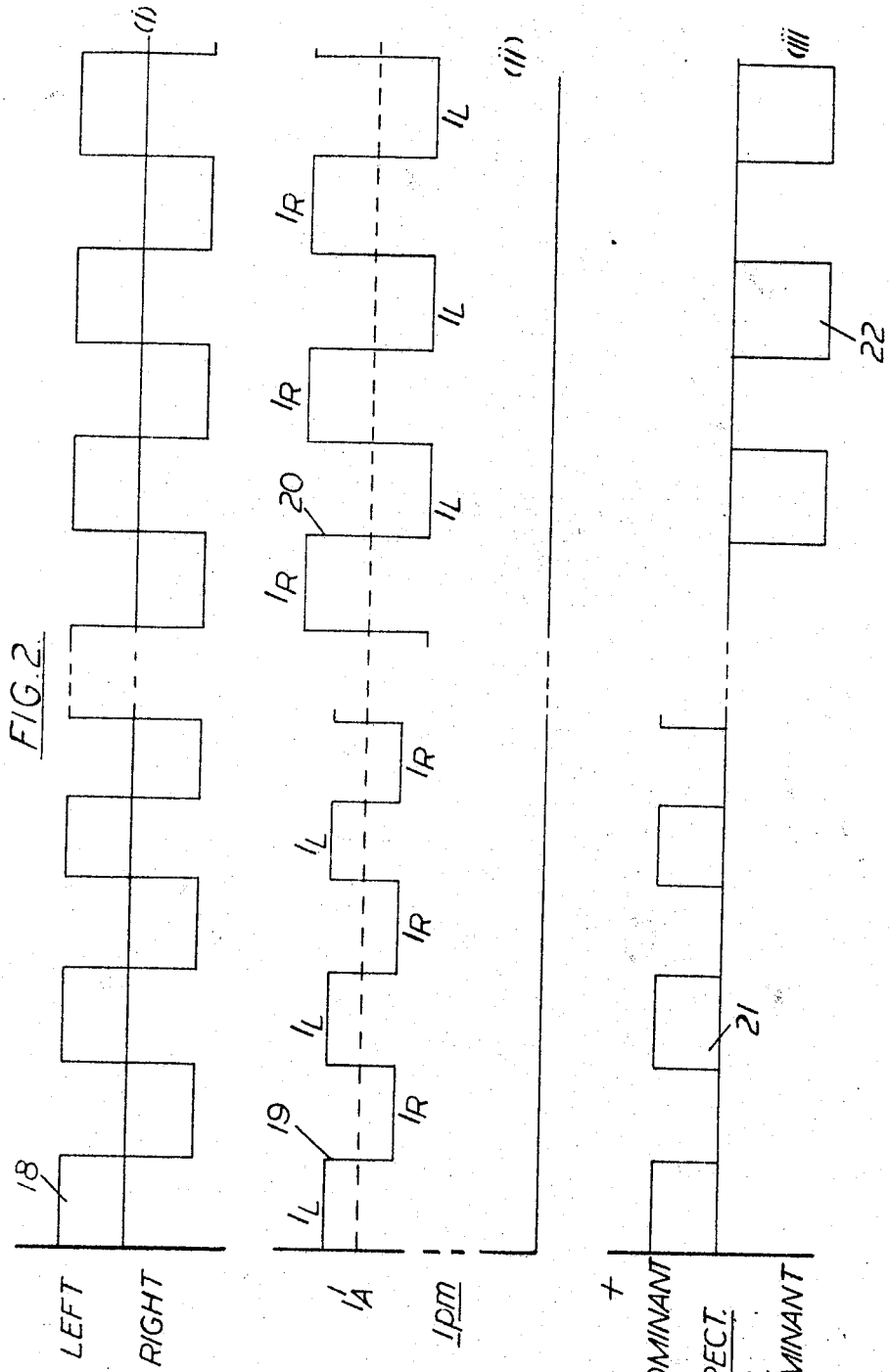
FIGURE 2 shows waveforms illustrating the operation of one form of detector arrangement used with the instrument of FIGURE 1.

Referring to FIGURE 1 an adjustable monochromator 1 produces a beam 2 of non-polarised radiation hereinafter referred to as "light" but which term will be understood to include non-visible radiation in the infra-red and ultra-violet ranges. Beam 2 is formed into a convergent beam 3 by an optical system represented as lens 4 and enters a polariser 5 from whence it emerges as two othogonally plane polarised beams 6 and 7.

The polariser 5 may conveniently be of the Wollaston type which consists of two wedge-shaped pieces of calcite having crossed optical axes and whose slant faces may be cemented together with a layer of an optical jointing medium transparent at the radiation frequencies employed in the apparatus. A beam of non-polarised light incident upon one face of the polariser is split into oppositely deviating beams of equal intensity plane polarised mutually perpendicularly and emergent from the opposite face. Alternatively the polariser may be of the Rochon type splitting the incident beam into polarised components similar to those produced by the Wollaston polariser but only one of which is deviated.

As no interference occurs between the beams 6 and 7 owing to their being polarised at right angles and their travelling in different directions, a circularly polarising device 8 may be employed which is common to both beams. The device 8 may be of the adjustable Soleil compensator type which is well known in the art and which described in detail on page 533 of "Fundamentals of Optics," Jenkins and White (second edition). Orientation of the compensator in the apparatus such that its fast axis is at $\mp 45°$ respectively to the polarisation planes of beams 6 and 7 causes the resolution of each beam into two component rays of equal intensity but with vibrations perpendicular to one another. The compensator subsequently introduces a phase shift of 90° (or $\lambda/4$) between the two component rays of each beam, the other necessary condition for circular polarisation. One of the emergent beams from the compensator is circularly polarised in a left handed sense and the other in a right handed sense, the difference being due to the difference in sign of the angles which the polarisation planes of the beams 6 and 7 make with the fast axis of the polariser. Where the device 8 is of the Soleil compensator type accurate adjustment must be made to the position of one of the wedge prisms to ensure that the phase difference introduced between the component rays of each beam is $\lambda/4$ at each radiation frequency. The adjustment may be manually made by means of a calibrated micrometer type arrangement or more conveniently the compensator may be mechanically linked as indicated by the dotted line 9 to the adjustable monochromator so that the compensator is automatically set to produce circular polarisation for the radiation frequency selected.

As an alternative to the employment of an adjustable circular polariser an achromatic circular polariser may be incorporated into apparatus according to the invention. One such device is described by Destriau and Prouteau in the J. Phys. et Radium No. 10, 1949 and consists of two components respectively introducing retardances of one-half and one-quarter of a wavelength between the component rays of each beam at mid-range radiation frequencies, their axes being inclined at 15° and 75° to the plane of polarisation of the incident light. Another such device is described by Pancharantam in Proc. Indian Acad. Sci. A.41, 1955 and consists of three components at various angles to a reference direction, accurately producing circularly polarised light over a substantial range of radiation frequencies.

The circularly polarised beams 10 and 11 emergent from the circular polariser 8 respectively pass above and below the rotational axis of a rotating chopper blade 12. This blade is shown in side elevation in FIGURE 3 and is driven by drive means 13 shown diagrammatically in FIGURE 2. Thus the two beams are alternately blocked by the chopper blade 12 allowing first one beam and then the other to traverse a sample 14, most usually in solution, of the material under investigation and enter a photosensitive photomultiplier detector tube 15, associated with which are amplifying and rectifying means 16 and indicating and/or recording means 17.

The circular dichroic absorbance of a material i.e. the index of the degree of circular dichroism exhibited, may be defined as the difference between the absorbance of the material for left-handed circularly polarised radiation and for right-handed circularly polarised radiation. The absorbance of a sample of material may be defined as the logarithm of the ratio of the intensities of a beam of radiation at the point of incidence and the point of emergence, i.e.

$$A = \log\left(\frac{I_0}{I}\right)$$

where A is absorbance, $I_0$ the incident intensity and I the emergent intensity.

The circular dichroic absorbance C is, by definition, $$C = A_L - A_R$$

Therefore $$C = \log\left(\frac{I_0}{I_L}\right) - \log\left(\frac{I_0}{I_R}\right) = \log\left(\frac{I_R}{I_L}\right)$$

where $I_L$ and $I_R$ are the intensities of the emerging left-hand beam and right-hand beam respectively and assuming that the oppositely polarised beams are of equal intensity $I_0$ on incidence.

In practice C is small and $I_L$ and $I_R$ differ only slightly from the means emergent intensity $\bar{I}$. This being so, to a close approximation:

$$\log\frac{I_R}{I_L} \simeq \log\left[1 + \frac{I_R - I_L}{\bar{I}}\right]$$

$$\simeq K\left[\frac{I_R - I_L}{\bar{I}}\right]$$

where K is a constant and, if $\bar{I}$ is maintained constant then $$C \propto (I_R - I_L)$$

Assuming that the sample 14 exhibits circular dichroism the two beams 10 and 11 are differentially absorbed and are of different intensities upon striking detector tube 15. The anode current of the tube thus has a component alternating at beam alternation frequency with a peak to peak amplitude proportional to the intensity difference between the two impinging beams. The phase of the signal relative to the phase of the beam chopper 12 indicates which of the two beams is predominantly absorbed. If this signal is separated, amplified and rectified synchronously with beam alternation the resulting direct current will be proportional to the intensity difference between the two beams emergent from the sample and hence as indicated above, proportional to its circular dichroic absorbance provided either that the mean direct current representing $\bar{I}$ is set to some constant level before measurement of $(I_R - I_L)$ or alternatively is maintained constant by programming, servo control or an AGC method. The polarity of the signal is indicative of which sense of circular polarised light is predominantly absorbed.

The direct current signal is applied to indicating and/or recording means 17 to produce a direct indication of the circular dichroic absorbance of the sample under investigation. For example the indicating means could be a meter with a centre zero movement calibrated in circular dichroic absorbance either side of zero, deflection direction indicating the predominant absorbance.

Referring to FIGURE 2 which illustrates the operation of the detector system, waveform 18 of (i) shows the alternation of left- and right-hand polarised beams through the sample whilst (ii) shows the variation of anode current of the detector tube 15. Waveform 19 represents the alternation at beam frequency between current levels representative of the intensities of the two beams upon the detector, the right-hand polarised beam being absorbed more than the left-hand beam. Waveform 20 represents a further example where the left-hand beam is absorbed more than the right-hand beam and the difference between the two absorbances is greater.

In both examples the variation of detector anode current is arranged to be about a constantly maintained mean current $I'_A$ for the reason above mentioned. Waveform 21 of (iii) shows the synchronously rectified signal 19 before smoothing and waveform 22 the synchronously rectified signal 20 before smoothing. Positive current is here arbitrarily taken to represent a predominant right-hand absorbance and negative a predominant left-hand absorbance.

Although one particular detector system has been described it will be obvious to those skilled in the art that other systems may be employed. For example a system such as is described by Haribaran and Bhalla in the Journal of the Optical Society of America (vol. 47, p. 378) may be used.

I claim:

1. Apparatus for measuring the degree of circular dichroism exhibited by a material comprising means for deriving two orthogonally plane polarised beams of radiation from a non-polarised beam of radiation, means for converting the two plane polarised beams respectively into beams circularly polarised in opposite rotational senses, means for passing the circularly polarised beams alternately through a sample of the material and means for comparing the intensities of the beams emergent from the sample.

2. Apparatus as claimed in claim 1 comprising achromatic circularly polarising means common to both of said beams.

3. Apparatus as claimed in claim 1 comprising chromatic circularly polarising means.

4. Apparatus as claimed in claim 3 comprising an adjustable monochromator for producing the non-polarised beam of radiation and means linking said monochromator and said chromatic circularly polarising means, effecting automatic adjustment of the circularly polarising means for each different radiation frequency.

5. Apparatus for measuring the degree of circular dichroism exhibited by a material comprising means for producing a non-polarised beam of radiation, means for deriving from said non-polarised beam two orthogonally plane polarised beams of radiation of equal intensity, means for converting the two plane polarised beams into beams circularly polarised in opposite rotational senses, means for allowing the circularly polarised beams to pass alternately through a sample of the material, detector means for producing an electrical signal related to the intensity difference between the two circularly polarised beams emergent from the sample and means connected to said detector means and responsive to said electrical signal to indicate the degree of circular dichroism exhibited by the material.

6. Apparatus as claimed in claim 5 in which the detector means comprise a photomultiplier detector tube, means for directing the circularly polarised beams emergent from the sample thereupon, and means for deriving from the detector tube an electrical signal having an amplitude related to the intensity difference between the two said incident beams and alternating at beam alternation frequency.

7. Apparatus as claimed in claim 6 in which the detector means comprises a synchronous rectifier, means for applying the said electrical signal to the synchronous rectifier and means for deriving from the synchronous rectifier a direct current of magnitude related to the circular dichroic absorbance of the material and a polarity indicative of the polarisation sense of the predominantly absorbed beam.

8. A method of measuring circular dichroism of a sample, the steps of
projecting a non-polarised radiation beam along a path, deriving from said projected beam a pair of orthogonally plane polarised beams of equal intensity,
converting said pair of beams into beams circularly polarised in opposite rotational senses, respectively,
passing the converted beams through the sample, alternately, and
comparing the intensities of the two emergent beams to produce a signal proportional to the difference in absorbance of the sample of the two beams and said signal having a polarity corresponding to the polarity of one of the emergent beams.

9. A method of measuring circular dichroism of a sample comprising the steps of
intermittently projecting a first circularly polarised radiation beam of fixed intensity through the sample, intermittently projecting a second circularly polarised radiation beam through the sample during intervals when said first circularly polarised beam is not being projected through the sample, said second beam being circularly polarised in opposite rotational sense to said first circularly polarised beam, and of equal intensity to said first beam,
comparing the intensities of the two emergent beams to produce a signal proportional to the difference in absorbance of the sample of the two beams and said signal having a sign corresponding to the polarity of the predominant of the emergent beams.

References Cited

UNITED STATES PATENTS

| | | | |
|---|---|---|---|
| 3,041,921 | 7/1962 | Pickels et al. | 88—14 |
| 3,055,263 | 9/1962 | Kuehne | 250—233 |
| 3,316,412 | 4/1967 | Hirschberg | 250—225 |

JAMES W. LAWRENCE, *Primary Examiner.*

D. O'REILLY, *Assistant Examiner.*

U.S. Cl. X.R.

250—218, 225; 356—225